(12) United States Patent
Marentic et al.

(10) Patent No.: US 6,832,503 B2
(45) Date of Patent: Dec. 21, 2004

(54) MACHINE FOR TESTING OCCUPANT RESTRAINT SYSTEM

(75) Inventors: Mark Marentic, Commerce Township, MI (US); John Sapielak, Dearborn Heights, MI (US); Roland Monk, Farmington Hills, MI (US); Derek Thomas, Whitmore Lake, MI (US); Gary Rock, Canton, MI (US); Glenn Kremer, Plymouth, MI (US); Don Hamilton, Wixom, MI (US); Greg Krom, Livonia, MI (US); Matt Debusk, Lake Orion, MI (US); Troy Deuchler, Taylor, MI (US); John Nathan, White Lake Township, MI (US)

(73) Assignee: Lear Corporation, Southfield, MI (US)

( * ) Notice: Subject to any disclaimer, the term of this patent is extended or adjusted under 35 U.S.C. 154(b) by 68 days.

(21) Appl. No.: 10/323,582

(22) Filed: Dec. 18, 2002

(65) Prior Publication Data

US 2004/0118178 A1 Jun. 24, 2004

(51) Int. Cl.⁷ .............................................. G01G 19/52
(52) U.S. Cl. ....................................................... 73/1.08
(58) Field of Search ................................ 73/1.15, 1.08, 73/1.13, 12.12, 12.14; 414/222.01, 222.03, 222.04, 222.05; 108/20, 51.1, 57.14, 144.11

(56) References Cited

U.S. PATENT DOCUMENTS

| | | | |
|---|---|---|---|
| 5,071,160 A | 12/1991 | White et al. | |
| 5,567,867 A | * 10/1996 | Nazar | 73/12.13 |
| 5,739,411 A | * 4/1998 | Lee et al. | 73/12.13 |
| 5,821,633 A | 10/1998 | Burke et al. | |
| 6,253,133 B1 | 6/2001 | Sakai et al. | |
| 6,260,879 B1 | 7/2001 | Stanley | |
| 6,264,236 B1 | 7/2001 | Aoki | |
| 6,282,473 B1 | 8/2001 | Steffens, Jr. | |
| 6,311,112 B1 | 10/2001 | Mazur et al. | |
| 6,539,771 B1 | * 4/2003 | Davidson et al. | 73/1.13 |
| 6,629,445 B2 | * 10/2003 | Yamanaka et al. | 73/1.13 |
| 2002/0027345 A1 | 3/2002 | Aoki | |
| 2002/0043789 A1 | 4/2002 | Lichtinger et al. | |

FOREIGN PATENT DOCUMENTS

| | | |
|---|---|---|
| JP | 2001-74542 | 3/2001 |
| WO | 98/58821 | 12/1998 |

OTHER PUBLICATIONS

Delphi, "Passive Occupant Detection System Gen II", http://www.delphi.com, ©2002 Delphi Automotive Systems.
MTS Sensors, "Temposonics Glossary", p. 1, Dec. 17, 2002, http://www.mtssensors.com/glossary2.html.

* cited by examiner

Primary Examiner—Robert Raevis
(74) Attorney, Agent, or Firm—Bill C. Panagos

(57) ABSTRACT

The present invention relates to a weight-drop machine for calibrating and verifying the calibration of an occupant detection system in a vehicle. The machine comprises a lift frame that is adapted to support and lift a seat pallet toward a keeper plate to cause the pallet to engage the keeper plate so that the pallet is prevented from movement. Another weight-drop machine a weight supported for movement relative to a frame, which, in turn, is supported for movement in a direction having both a horizontal component and a vertical component of movement in a single motion. Yet another weight-drop machine comprises one or more sensors that are adapted to sense the position of a vehicle seat. Still another weight-drop machine comprises a sensor for measuring displacement of the drop weight. A towel bar lift may be provided for lifting a towel bar for operating a manual seat lock mechanism.

6 Claims, 13 Drawing Sheets

MACHINE FOR TESTING OCCUPANT RESTRAINT SYSTEM

BACKGROUND OF INVENTION

1. Field of the Invention

The present invention relates generally to a system for sensing an object, or parts thereof, which is located in the seat of a motor vehicle. In particular, the invention relates to a machine for calibrating and verifying the calibration of an occupant detection system in a vehicle.

2. Description of the Prior Art

Occupant restraint systems for use in vehicles are well known in the art. One such occupant restraint system includes a crash sensor, an inflatable airbag, and an actuation circuit that controls deployment of the airbag in response to an output from the crash sensor. The crash sensor can be an accelerometer that provides an electrical signal having a value functionally related to the vehicle's deceleration. The actuation circuit includes a squib operatively connected to a source of inert gas.

During a crash condition of a vehicle, the vehicle's accelerometer provides a signal indicative of a such crash condition. The actuation circuit thereby applies a current through the squib which causes the squib to ignite. When the squib ignites, the source of inert gas discharges gas into the airbag, which results in the inflation of the airbag.

Certain vehicles have both a driver side airbag and a passenger side airbag ("dual airbags"). If such a vehicle is occupied only by the driver and is involved a crash, deployment of the passenger side airbag is unnecessary. Unnecessary deployment of the passenger side airbag can increase the cost of repairing the vehicle. If the passenger side is occupied by an occupant below a certain weight threshold or an infant, it may be desirable to suppress or otherwise regulate the manner in which the airbag is deployed. Since a large percentage of vehicles in use are occupied by only the driver, it is desirable to be able to detect if a passenger is present in the vehicle and deploy the passenger side airbag during a crash only if the passenger is, in fact, present.

Occupant detection systems are designed to measure the presence of an object, which may include the measurement of weight, on a vehicle seat to determine whether a passenger airbag should be suppressed. A typical occupant detection system includes a sensor and an electronic control unit for processing data from the sensor. The data corresponds to the weight on the vehicle seat. The electronic control unit processes the data and provides an "enable-deployment" output to a sensing and diagnostic module, if the weight on the seat is above the required threshold.

The occupant detection system is designed to suppress or otherwise regulate the deployment of the occupant restraint system. Vehicle manufacturers calibrate and verify the calibration of the occupant detection system. A conventional calibration and verification system drops a weight on the vehicle seat. Data corresponding to the weight is output from the sensor. The data is processed by the electronic control unit and calibration values are calculated. The calibration values are stored in an EEPROM. Once again, a weight is dropped on the seat. Data corresponding to the weight is processed by the electronic control unit and verification values are calculated. The calibration and verification values are compared. If the calibration and verification values are within a specified tolerance, the occupant detection system is acceptable for use.

The weight of a conventional calibration and verification system is attached to a cable. The cable is retracted onto a pulley to move the weight to an initial position from which the weight is dropped. The actual distance that the weight is dropped is limited to the length of the cable and the ability to accurately control the retraction of the cable onto the pulley. If the drop distance is not consistent and accurate, then the force of impact of the weight against the vehicle seat will vary. In addition to the inconsistent and inaccurate drop distance, the weight of the cable contributes to the drop weight. The conventional calibration and verification system also does not measure the drop weight. Consequently, the contribution of the weight of the cable to drop weight is unknown. Hence, the force of impact of the drop weight against the vehicle seat is unknown. Moreover, the conventional calibration and verification system does not properly align the drop weight with the seat. There is no means for determining whether the seat is properly positioned. Lastly, frictional affects on the drop weight are not measures by the conventional calibration and verification system. As a result, the affects of friction on the drop weight are unknown. This affects the velocity and thus, the force of impact of the drop weight against the seat. If the drop weight is not properly and consistently applied by the calibration and verification system, then the occupant detection system cannot be properly calibrated and verified and the airbag can improperly deploy.

What is needed is a calibration and verification system that accurately measures the drop weight, the frictional affects on the weight drop, and the drop distance. Moreover, a system is needed that properly aligns the drop weight with the seat.

SUMMARY OF INVENTION

The present invention relates to a calibration and verification system for an occupant detection system. The calibration and verification system accurately measures the drop weight, the frictional affects on the weight drop, and the drop distance of the weight.

A weight-drop machine according to one embodiment of the invention comprises a base. A lift frame is supported for movement relative to the base. A keeper plate is supported in a fixed position relative to the base. A displacement element is supported in a fixed position relative to the base and the lift frame. The displacement element is adapted to move the lift frame relative to the base. The lift frame is adapted to support and lift a pallet toward the keeper plate to cause the pallet to engage the keeper plate so that the pallet is prevented from further movement.

Another weight-drop machine according to the present invention comprises a bridge, a frame, and a weight supported for movement relative to the frame. The frame is supported for movement relative to the bridge in a direction having both a horizontal component and a vertical component of movement in a single motion.

Yet another weight-drop machine according to the present invention comprises a base, a sensor bracket supported for movement relative to the base, and one or more sensors supported relative to the sensor bracket. The one or more sensors are adapted to sense the position of a vehicle seat supported by the base frame.

Still another weight-drop machine according to the present invention comprises a drop weight including a guide shaft, a bearing supporting the guide shaft for movement, and a sensor connected between the guide shaft and the bearing for measuring displacement of the guide shaft relative to the bearing.

A towel bar lift may be provided for lifting a towel bar for operating a manual seat lock mechanism. The towel bar lift comprises a base and a lift frame supported for vertical and pivotal movement relative to the base. The lift frame has a cantilevered portion that is adapted to extend over the base and under a towel bar and further move upward away from the base and into engagement with the towel bar to move the towel bar upward.

Various objects and advantages of this invention will become apparent to those skilled in the art from the following detailed description of the preferred embodiment, when read in light of the accompanying drawings.

DETAILED DESCRIPTION

Figure 1:
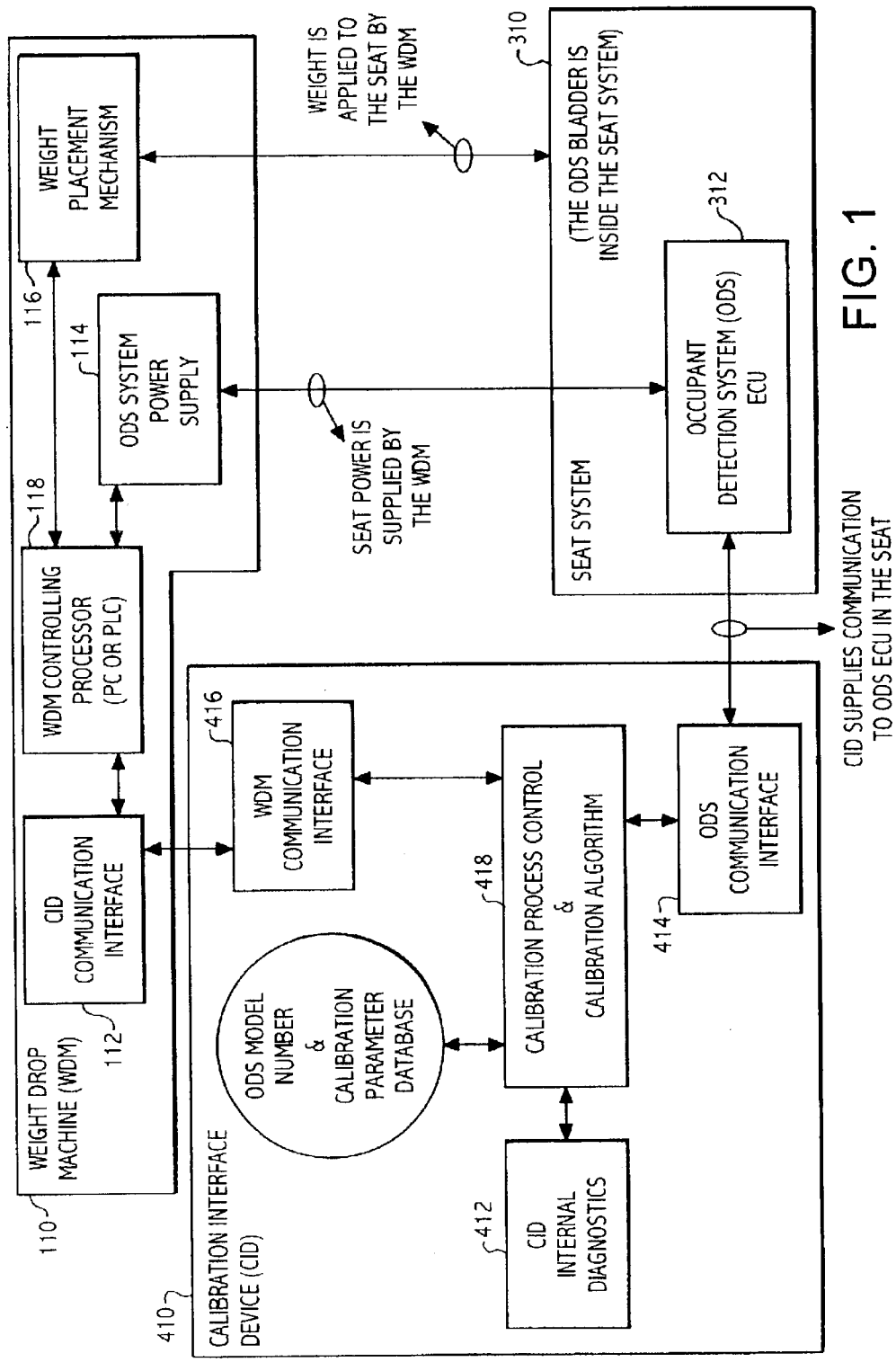
FIG. 1 shows a block diagram of a calibration and verification system for an occupant detection system.
Figure 2:
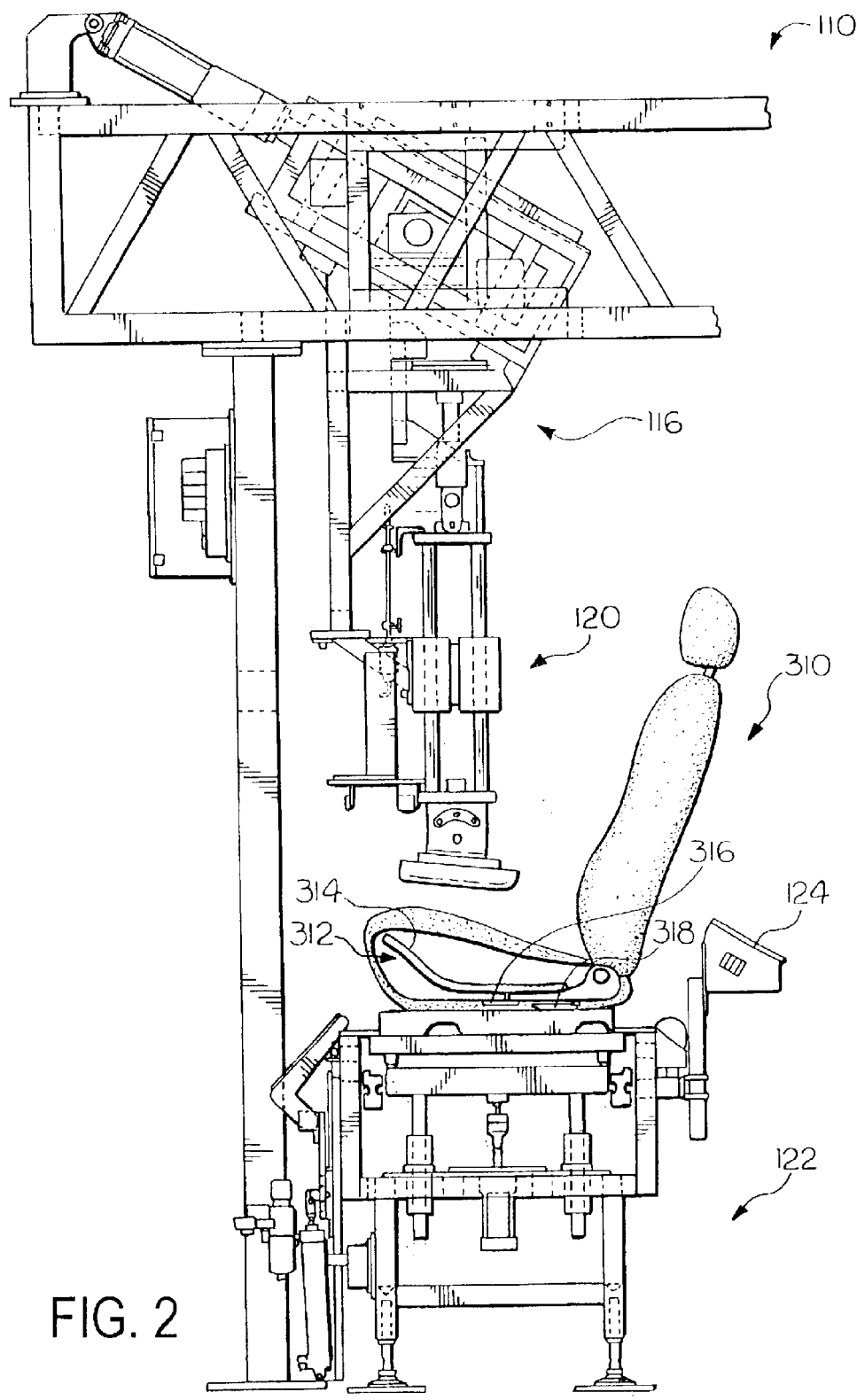
FIG. 2 shows a side elevational view of a weight-drop machine according to the present invention with a seat therein having an occupant detection system.

Referring now to the drawings, there is illustrated in FIG. 1 a weight-drop machine 110 for calibrating and verifying the calibration of an internal weight-based seat occupant detection system 312, which is set to suppress or otherwise regulate the deployment of a vehicle restraint system, such as an airbag (not shown). As shown in FIG. 2, the occupant detection system 312 includes a fluid-filled bladder 314 attached to a pressure sensor 316, which, in turn, is attached to an electronic control unit 318. The electronic control unit 318 processes data from the sensor 316 corresponding to the amount of pressure on the fluid-filled bladder 314, or weight on the seat 310 and provides an "ENABLE DEPLOYMENT" output to a sensing and diagnostic module (not shown), if the weight on the seat 310 is above the required threshold. Each seat will exert a different amount of pressure on the fluid-filled bladder 314, for both empty and occupied seat conditions, because of the foam and trim components and the seat assembly process. To compensate for these differences, the occupant detection system 312 of each seat is calibrated so the occupant detection system 312 response for each seat is the same.

During a calibration and verification operation, the weight-drop machine 110 communicates with the electronic control unit 318 of the occupant detection system 312 via a calibration interface device 410, as shown in FIG. 1. The calibration interface device 410 communicates with the weight-drop machine 110 as a "slave", only communicating with the electronic control unit 318 as instructed by the weight-drop machine 110. The calibration interface device 410 contains internal diagnostics 412, an interface 414 for communicating with the occupant detection system 312, an interface 416 for communicating with the weight-drop machine 110, and a calibration process control and calibration algorithm 418 for controlling the calibration interface device 410, calculating values to be programmed into the electronic control unit 318, and comparing the calibration values against predefined "PASS/FAIL" limits. The calibration interface device 410 also programs the EEPROM (not shown) in the electronic control unit 318 and verifies the EEPROM programming.

The weight-drop machine 110 includes an interface 112 for communicating with the calibration interface device 410, a power supply 114 for the occupant detection system 312, a weight-placement mechanism 116, and a processor 118 for controlling the function of the weight-placement mechanism 116. The controlling processor 118 will also be responsible for determining whether the occupant detection system 312 is correct for the seat 310 being calibrated and recording the occupant detection system 312 model number and the traceability information (e.g., a build sequence number, which tracks the seat production from beginning to end; the state (i.e., either near the airbag or a predetermined distance away) of the seat track position sensor mounted on the seat track, which is critical to the restraint system because it effects how the airbag is blown; a log of the date and time of the calibration; the weight and velocity of the drop weight and the drop distance during each weight drop; an empty seat weight and weighted seat reading; and a filter count of the seat). Traceability information is forwarded to a vehicle manufacturer, at the vehicle manufacturer's request. If the occupant detection system 312 fails, the weight-drop machine 110 can inform a repair station or operator of the cause of the failure. This information will be useful in determining whether seat build conditions are causing the failure.

The calibration and verification process includes three operations: a stress-relief or pre-drop operation, a calibration or threshold set operation, and a verification operation. The pre-drop operation occurs prior to the threshold set operation. During the pre-drop operation, the seat 310 is loaded into the weight-drop machine 110 and clamped into place. Its occupant detection system 312 (i.e., the seat harness) is connected to the occupant detection system power supply 114 and its barcode is scanned. The calibration interface device 410 performs a self-diagnostics. The weight-placement mechanism 116 moves a weight 120 (shown in FIG. 2) to a "ready" position. Once the weight 120 is in the ready position, the weight 120 is dropped onto the seat 310 and then removed where it is held in a "hold" position. The seat 310 is permitted to stabilize. No data is taken during this operation. Power is applied to the occupant detection system 312 (i.e., the electronic control unit 318). Traceability and other information are extracted from the electronic control unit 318. The calibration interface device 410 determines if the occupant detection system 312 is functional. Traceability information is forwarded to the weight-drop machine 110. The weight-drop machine 110 determines if the electronic control unit 318 matches the seat type. During the threshold set operation, the weight 120 is dropped from a "drop" position onto the seat 310. Threshold data is read from the electronic control unit 318 once the weight 120 has stabilized. After reading the threshold data, the weight-placement mechanism 116 removes the weight 120 from the seat 310 where the weight 120 is again held in the "hold" position. After the seat 310 has stabilized, empty seat data is read from the electronic control unit 318. Calibration values (e.g., "ENABLE THRESHOLD" and "EMPTY SEAT" values) are calculated and compared against screening limits for an acceptable calibration. These calibration values are used to determine if the occupant restraint system will be deployed. If the calibration values are unacceptable, the weight-placement mechanism 116 moves the weight 120 to a "clear" position and the seat 310 is removed from the weight-drop machine 110 and repaired. If the calibration data values are acceptable, the calibration values are stored into an EEPROM. Power is then removed from the occupant detection system 312 to reset the electronic control unit 318 (i.e., clear history flags). After an appropriate amount of time has passed to guarantee that the electronic control unit 318 has reset, power is restored to the occupant detection system 312. During the verification operation, the weight 120 is again dropped from the "hold" position onto the seat 310. Once the weight 120 has stabilized, verification data is read from the electronic control unit 318. Then, the weight 120 is again removed from the seat 310 and moved to the "hold" position. The verification data is compared with the threshold data to verify the contents of the EEPROM to ensure that the values are within the specified tolerance. If the contents of the EEPROM cannot be verified, the threshold set operation is repeated or the seat 310 is removed from the weight-drop machine 110 and repaired. If contents of the EEPROM are verified, the weight-drop machine 110 retrieves data from the electronic control unit 318 for traceability and the weight-placement mechanism 116 moves the weight 120 to the "clear" position.

Figure 3:
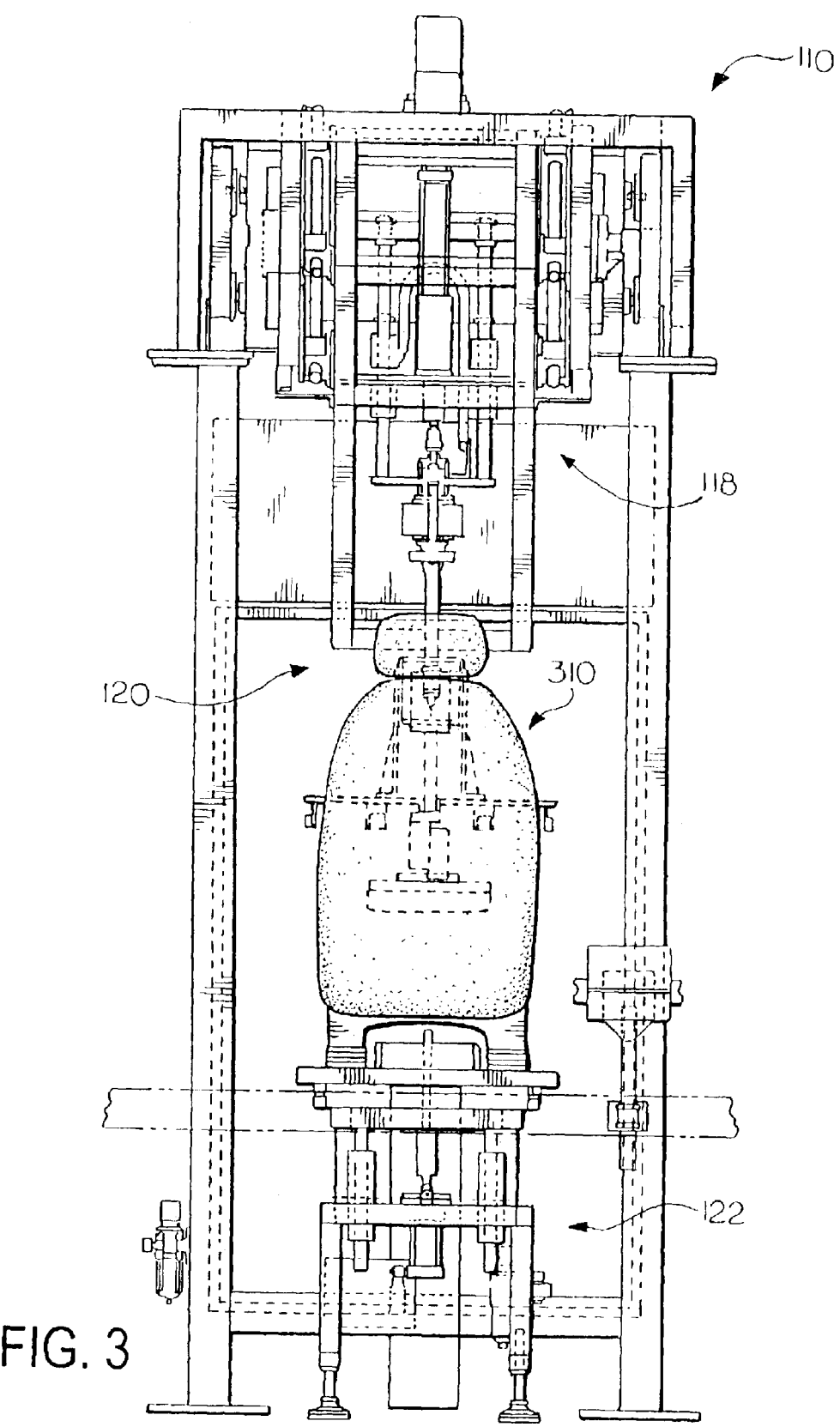
FIG. 3 shows a front elevational view of the weight-drop machine and seat illustrated in FIG. 1.

As illustrated in FIGS. 2 and 3, the weight-drop machine 110 according to the present invention is comprised of a machine base 122 for supporting the vehicle seat 310. The machine base 122 can be fixed relative to a supporting surface, such as a manufacturing plant floor. The drop weight 120 is a weight supported for movement relative to the machine base 122 by the weight placement mechanism 116. Mechanical and electrical controls control the operation of the weight-drop machine 110 via input from an operator through an operator interface device 124. The controlling processor 118 (i.e., the personal computer or program control logic computer shown in FIG. 1) controls the function of the mechanical and electrical controls. Although a single weight-drop machine 110 is shown, multiple weight-drop machines can be arranged to support multiple workstations.

Figure 4:
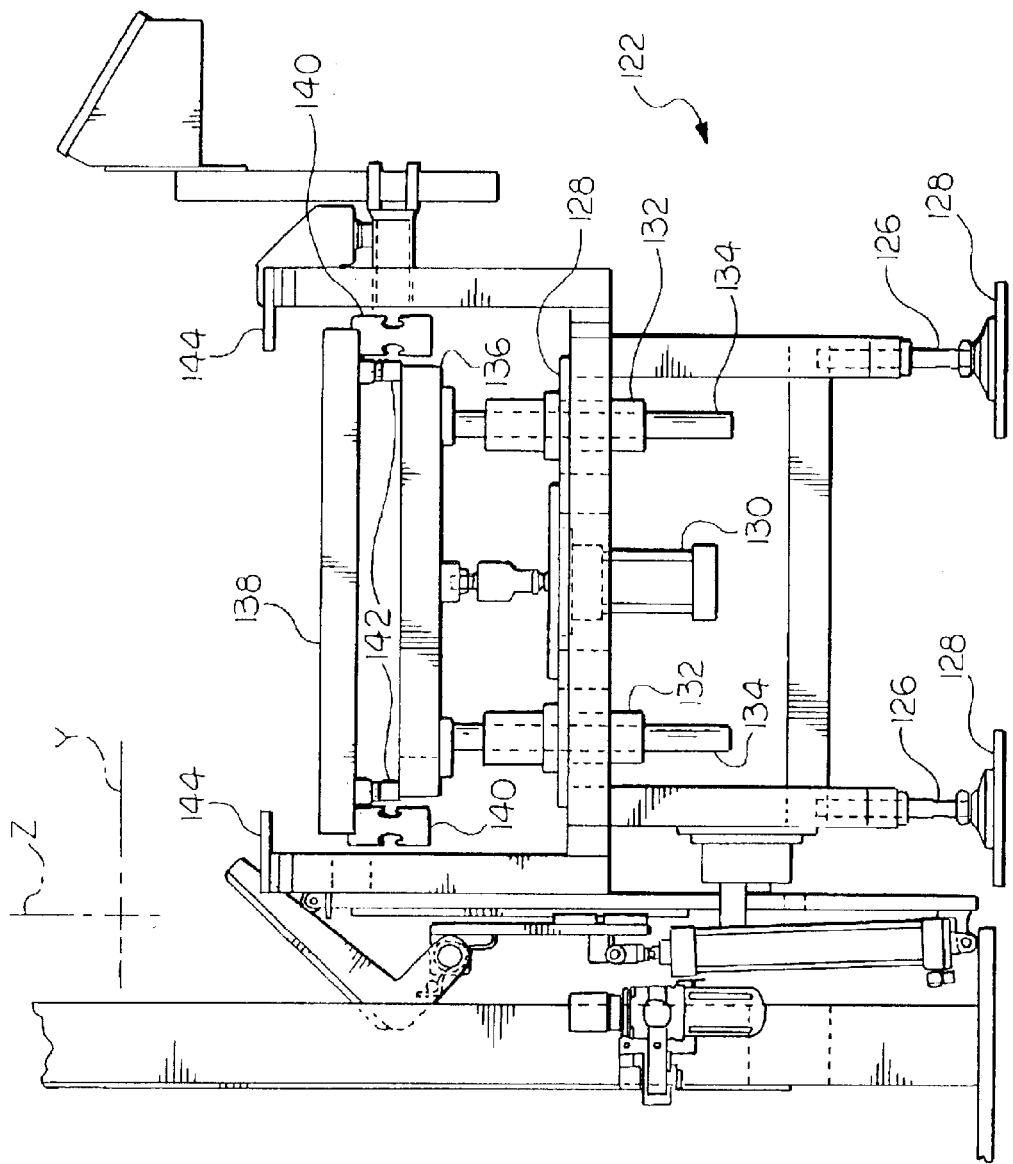
FIGS. 4 and 5 show enlarged side elevational views of a lift frame lift according to the present invention in lowered and raised positions, respectively.
Figure 5:
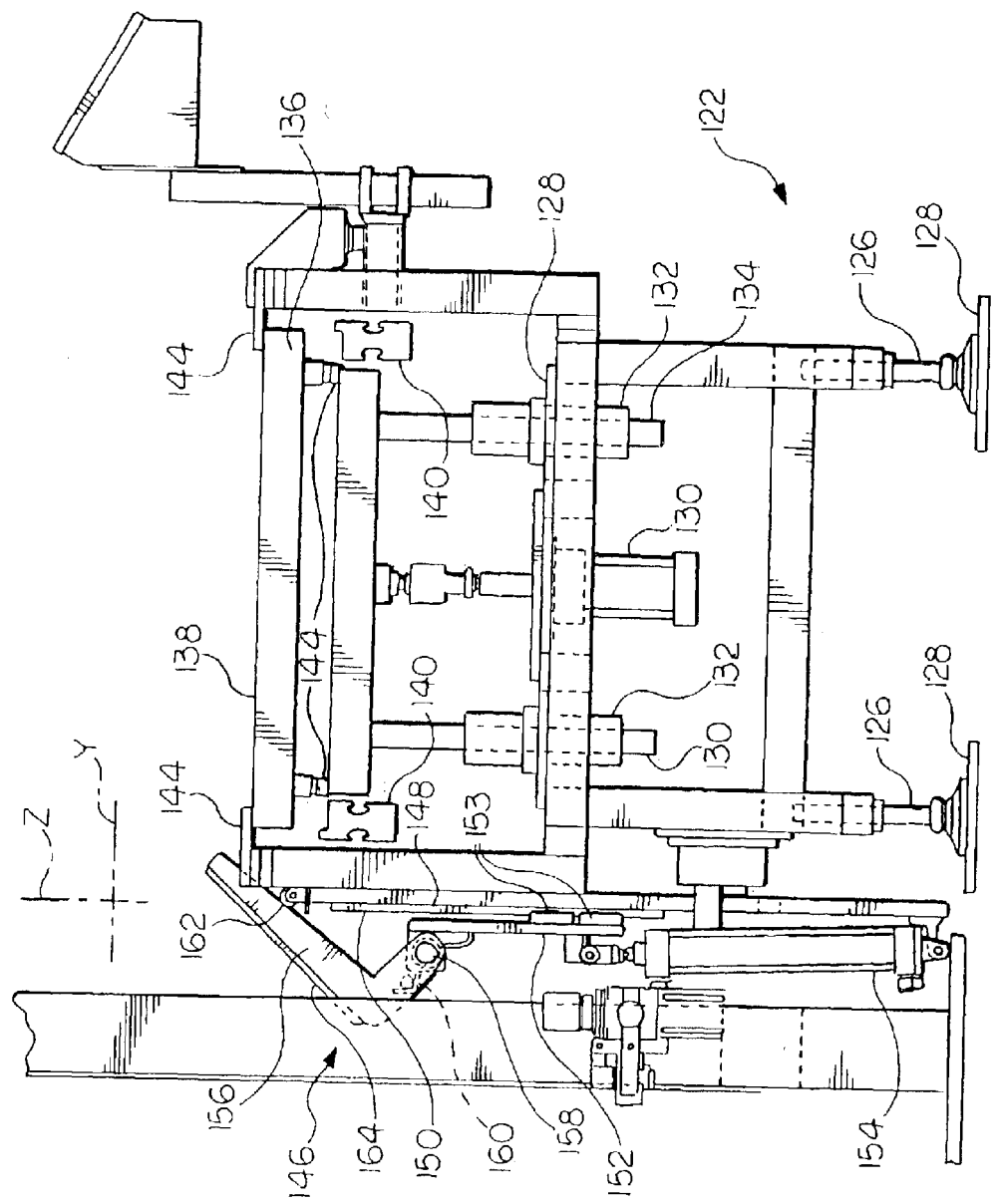

As shown in FIGS. 4 and 5, the machine base 122 has extending from its bottom end four threaded rods 126 with leveling feet 128 attached thereto for leveling the machine base 122 relative to the supporting surface. The leveling feet 128 are rigidly attached to the supporting surface. The threaded rods 126 are threaded into the machine base 122 to adjust the height of the base 122 relative to the supporting surface. A cylinder plate 128 is supported in a fixed generally horizontal position relative to an intermediate portion of the machine base 122. The cylinder plate 128 has at its center a displacement element, such as a pneumatic cylinder or the linear actuator 130 shown. Located about the actuator 130 are four bearings 132. The four bearings 132 are spaced equidistantly apart from the actuator 130 and attached to the machine base 112 by four cylinder brackets. Each bearing 132 receives a downward extending guide shaft 134 (e.g., a linear race). An upper portion of each guide shaft 134 is attached to the bottom of a lift frame 136. The lift frame 136 is substantially square in shape and thus has four corners. The guide shafts 134 are attached to the four corners of the lift frame 136. An upper portion of the actuator 130 is attached to the center of the lift frame 136. The actuator 130 is retracted to pull the lift frame 136 down to a lowered position, as shown in FIG. 4. The actuator 130 is extended to push the lift frame 136 up to a raised position, as shown in FIG. 5. As the lift frame 136 moves up and down, the guide shafts 134 move linearly within the four bearings 132. With the lift frame 136 in the lowered position, a seat pallet 138 can be placed on pallet support blocks 140 located above the cylinder plate 128, as shown in FIG. 4. A seat 310 (shown in FIGS. 1 and 2) is clamped to the pallet 138 for calibration and verification. Extending upward from an upper portion of the lift frame 136 from each of its four corners are locating pins 142. As the lift frame 136 is raised, the locating pins 142 enter into corresponding holes in four corners of a bottom portion of the pallet 138 to locate the pallet 138 relative to the lift frame 136. As the lift frame 136 is moved to the raised position, the pallet 138 engages one or more keeper plates 144, as shown in FIG. 5. The keeper plates 144 are fixed relative to an upper portion of the machine base 122. According to a preferred embodiment of the invention, the keeper plates 144 are attached to risers at the four corners of the upper portion of the machine base 122. The pallet 138 engages the keeper plates 144 so that the pallet 138 does not move or vibrate during the calibration and verification operation. This holds the seat 310 firmly in place during the calibration and verification operation.

Figure 6:
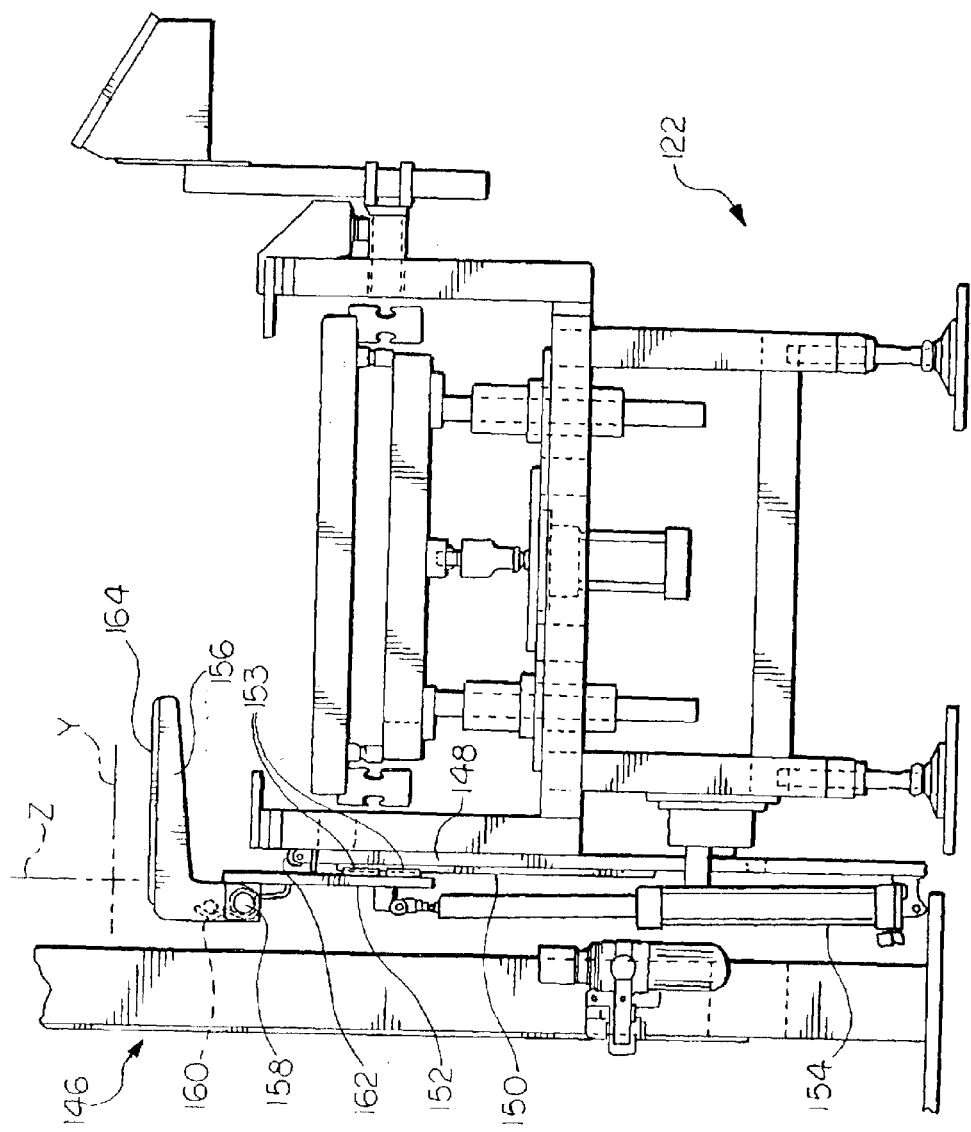
FIG. 6 shows an enlarged side elevational view of a towel bar lift according to the present invention in a raised position.

As shown in FIGS. 5 and 6, the weight-drop machine 110 may be equipped with a towel bar lift 146 to lifting the towel bar (i.e., seat adjustment lever) for operating a manual seat lock mechanism (not shown). This permits a machine operator or controlling processor to move the seat 310 forward and back without reaching around from a position behind the back of the seat 310 to the front of the seat 310 to gain access to the towel bar. The towel bar lift illustrated includes a bracket 148 that is supported in a fixed position relative to a front frame portion of the machine base 122. In the illustrated embodiment, a bearing, such as the linear bearing 150 shown, is supported in a fixed position relative to a front upper portion of the bracket 148. A plate 152 moves up and down (i.e., along a Z-axis) in a plane along the linear bearing 150 via pivot blocks 153. This movement can be achieved through the use of a displaceable element, such as a pneumatic cylinder or the linear actuator 154 shown. A lower end of the actuator 154 is shown connected to a lug extending from a lower portion of the bracket 148. An upper end of the actuator 154 is connected to a lug extending from a lower portion of the plate 152. As the actuator 154 extends and retracts, the plate 154 moves up and down, respectively, on the linear bearing 150. A lift frame, such as the L-shaped lift frame 156 shown, is supported for pivotal movement relative to the plate 152. In the illustrated embodiment, the lift frame 156 is pivotally connected to a lug extending from an upper portion of the plate 152. This can be accomplished with a pin 158, as illustrated in the drawings. The lift frame 156 is preferably biased in a direction (i.e., along a Y-axis) toward the machine base 122 (i.e., clockwise when viewing the drawings). This can be accomplished, for example, by use of a spring, such as the torsion spring 160 carried by the pin 158. As the plate 152 moves up, the lift frame 156 moves up and over the machine base 122. According to the preferred embodiment of the invention, a low-friction member, such as a glide or the roller bearing 162 shown, is supported relative to an upper portion of the bracket 148. The lift frame 156 initially cams against the roller bearing 162. Contact between the lift frame 156 and the roller bearing 162 is maintained until a portion of the lift frame 156 becomes generally horizontal, as shown in FIG. 6. Continued movement of the lift frame 156 in an upward direction causes the lift frame 156 to engage the towel bar and push the towel bar up to unlock the manual seat lock mechanism. The lift frame 156 preferably supports a non-marking material 164, which reduces the risk of damage to the towel bar finish. As the actuator 154 retracts, the plate 150 is pulled down. As the plate 150 is pulled down, the lift frame 156 moves down once again into contact with the roller bearing 162, which urges the lift frame 156 away from the machine base 122 (i.e., counter-clockwise when viewing the drawings). It should be appreciated by one of ordinary skill in the art that the lift frame 156 shown and described is provided for illustrated purposes. Other lift frames 156 may be suitable for carrying out and fall within the scope of the present invention.

Figure 7:
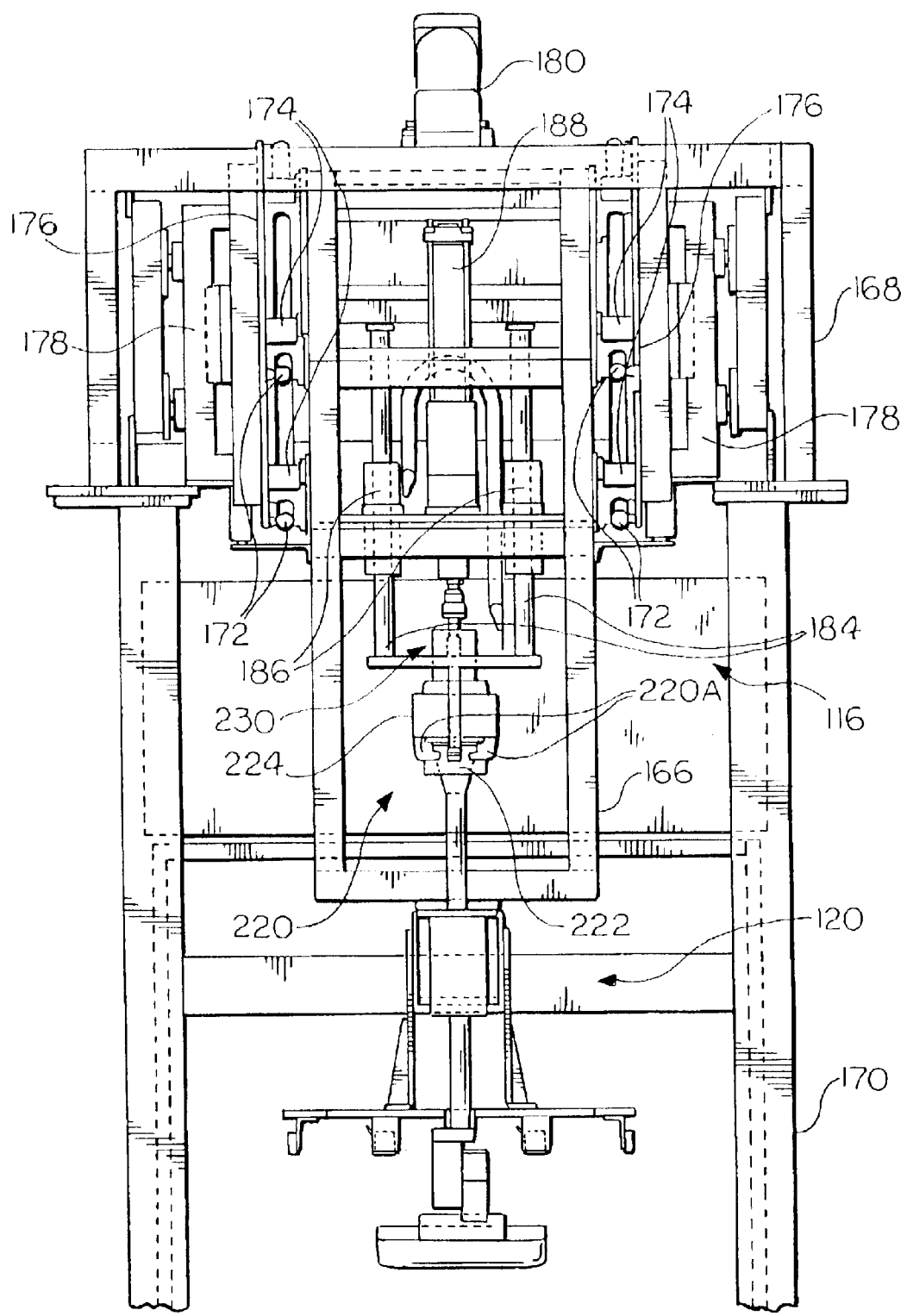
FIG. 7 shows enlarged front elevational view of a weight-placement mechanism according to the present invention.
Figure 8:
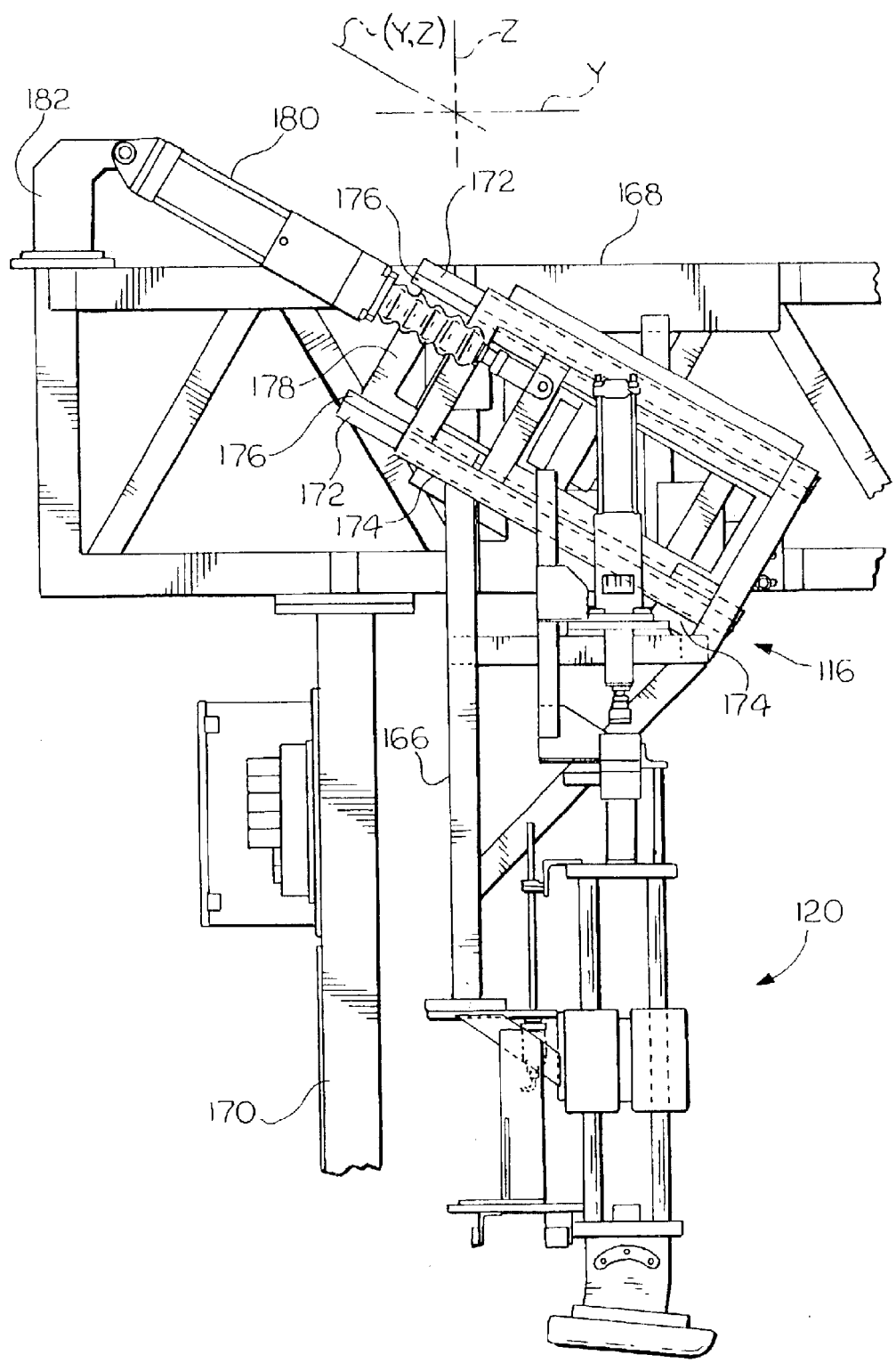
FIGS. 8 and 9 show enlarged side elevational views of the weight-placement mechanism illustrated in FIG. 6 in retracted and extended positions, respectively.
Figure 9:
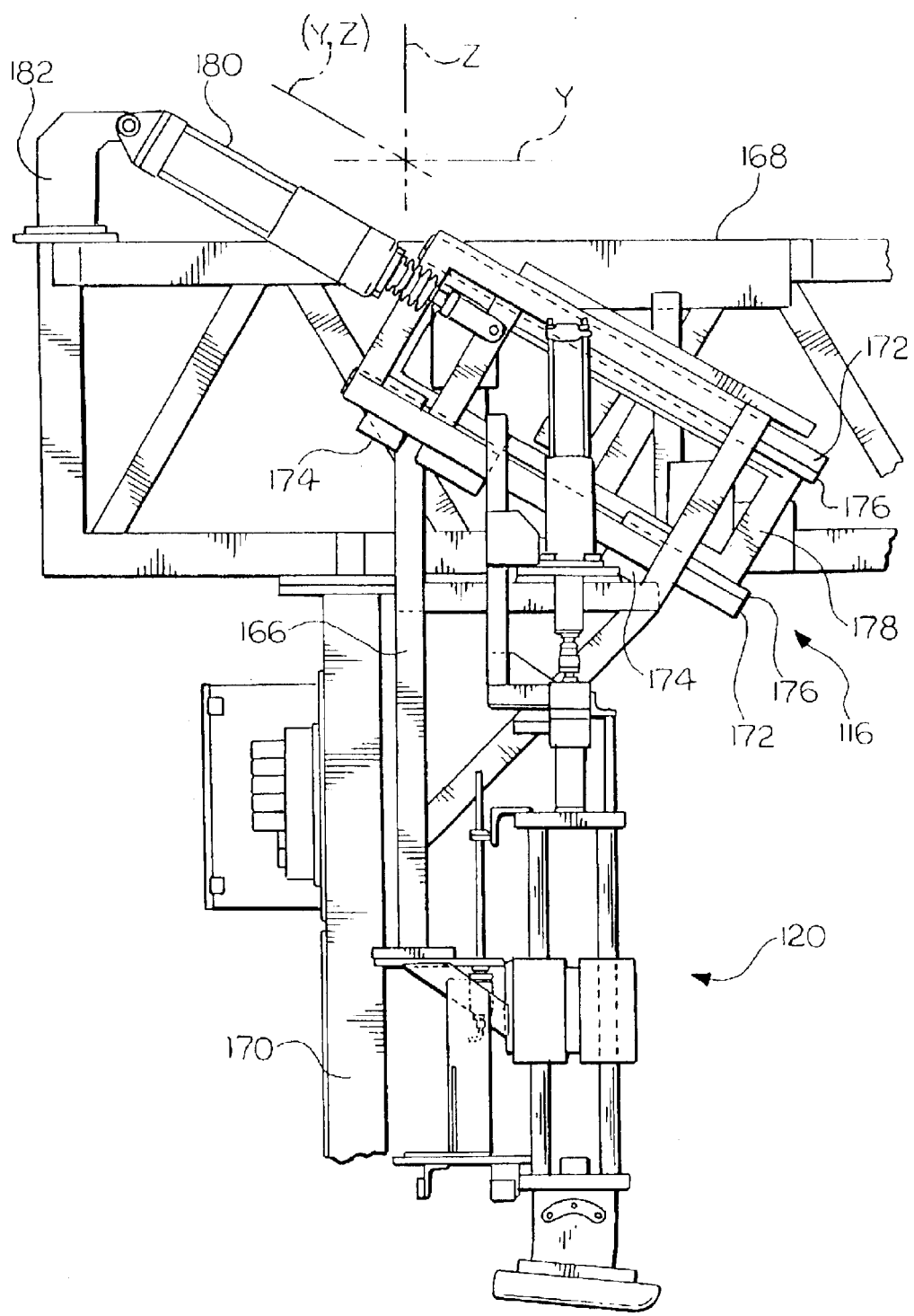

The weight-placement mechanism 116 according to the preferred embodiment of the invention is supported for movement relative to a frame 166. According to the illustrated embodiment, the frame 166 is supported for movement relative to a bridge 168, which is held in a fixed relation to the machine base 122 by rails 170 that extend vertically from the supporting surface. As shown in FIGS. 7 through 9, the frame 166 is supported for movement relative to the bridge 168 by bearings or linear races 172. The frame 166 is supported for movement relative to the races 172 by pillow blocks 174. The races 172 are coupled to guide shaft bases 176 by support rails 178. The guide shaft bases 176 are supported relative to the bridge 168 at a predetermined angle (e.g., 38 to 40 degrees) relative to a horizontal plane. This angle may be application specific. A displacement element, such as a pneumatic cylinder or the linear actuator 180 shown, is connected between the frame 166 and the bridge 168. The actuator 180 preferably includes a stroke reading cylinder, such as CEU2D100-175J-A54L manufactured by SMC Corporation of America, in Indianapolis, Ind., USA, which has an optical encoder on a shaft senses the position on the shaft, and a controller, such as CEU2P-H0034 also manufactured by SMC Corporation of America, in Indianapolis, Ind., USA, to control the position of the shaft. As shown in FIGS. 8 and 9, a lower end of the actuator 180 is connected relative to the frame 166 and an upper end is connected to a bracket 182 that is held in a fixed relation to bridge 168. The actuator 180 extends and retracts to move the frame 166 along the races 172. The actuator 180 extends to move the weight-placement mechanism 116 down and toward the seat 310 and retracts to move the weight-placement mechanism 116 up and away from the seat 310. The frame 110 functions as a two-way position locator involving two-components of movement (i.e., movement along the Y and Z-axis) in a single motion rather than moving two separate and independent movements. It should be appreciated by one of ordinary skill in the art that the present invention is not intended to be limited the structure shown and described above and that the two-components of movement can be carrying out by other suitable structure.

The drop weight 120 is supported for movement in the vertical direction (i.e., along the Z-axis) by one or more shafts 184 (shown in FIG. 7), which are supported for movement relative to corresponding bearings 186. A displaceable element, such as a pneumatic cylinder or the linear actuator 188 shown, which may include a stroke reading cylinder, such as CE2F63-250J-A54L manufactured by SMC Corporation of America, in Indianapolis, Ind., USA, which has an optical encoder on a shaft senses the position on the shaft, and a controller, such as CEU2P-H0034 also manufactured by SMC Corporation of America, in Indianapolis, Ind., USA, to control the position of the shaft. The linear actuator 188 is provided for moving the drop weight 120. The actuator 188 supported relative to the aforementioned frame 166 and the drop weight 120. The drop distance is set by displacing the drop weight 120 relative to the frame 166. The drop weight 120 is moved by the actuator 188 to drop the weight 120 a predetermined distance (e.g., about 4 in.±0.5 in. or about 102 mm) free air prior to contacting the seat 310. This will be specified as a part of the drop distance that is measured from a fully retracted position to a load position (i.e., at rest on the seat 310) and will be seat compression dependent. Consequently, the drop distance may be application specific.

Figure 10:
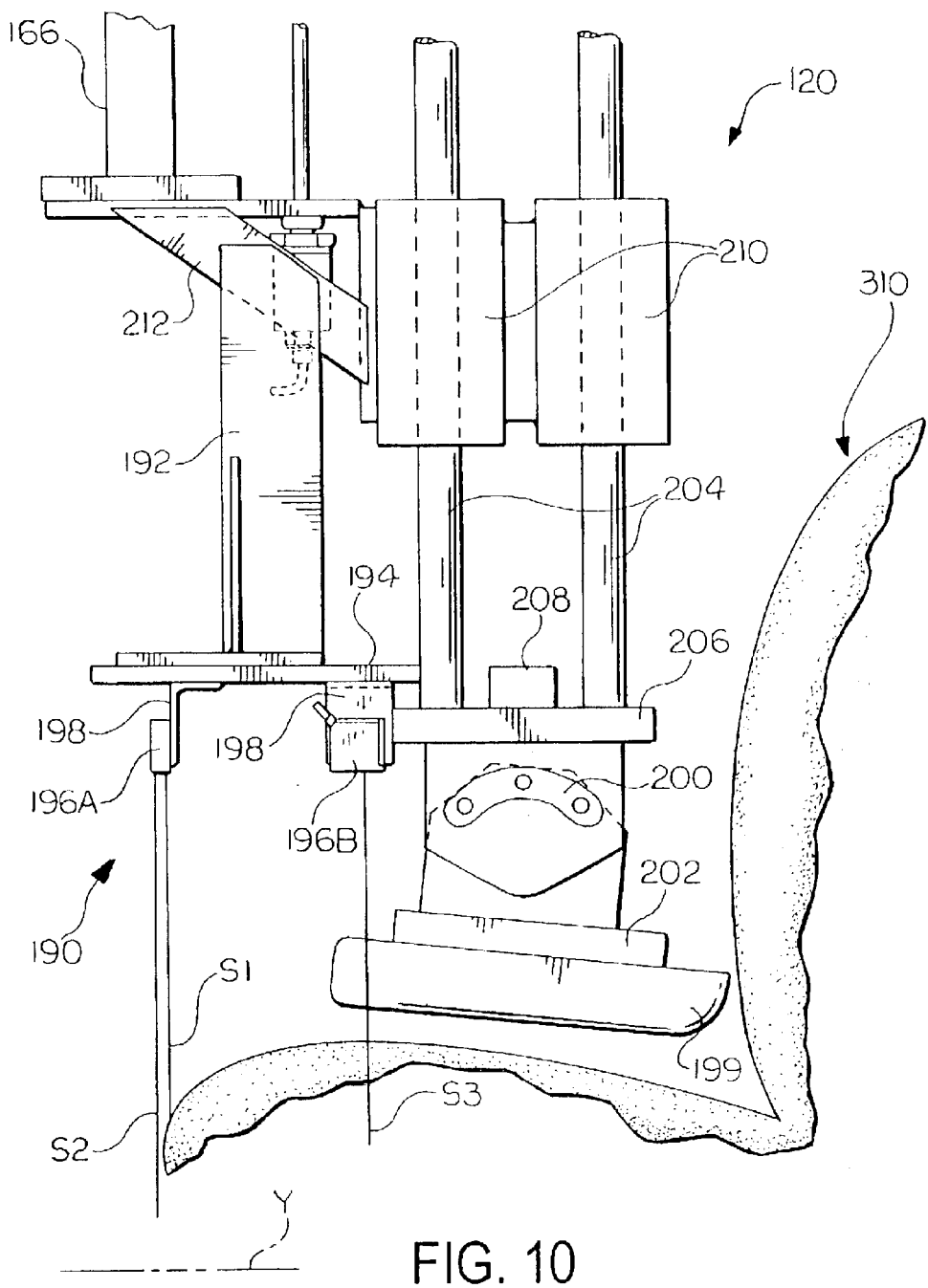
FIG. 10 shows enlarged side elevational view of an apparatus according to the present invention for positioning a drop weight in X and Y directions.
Figure 11:
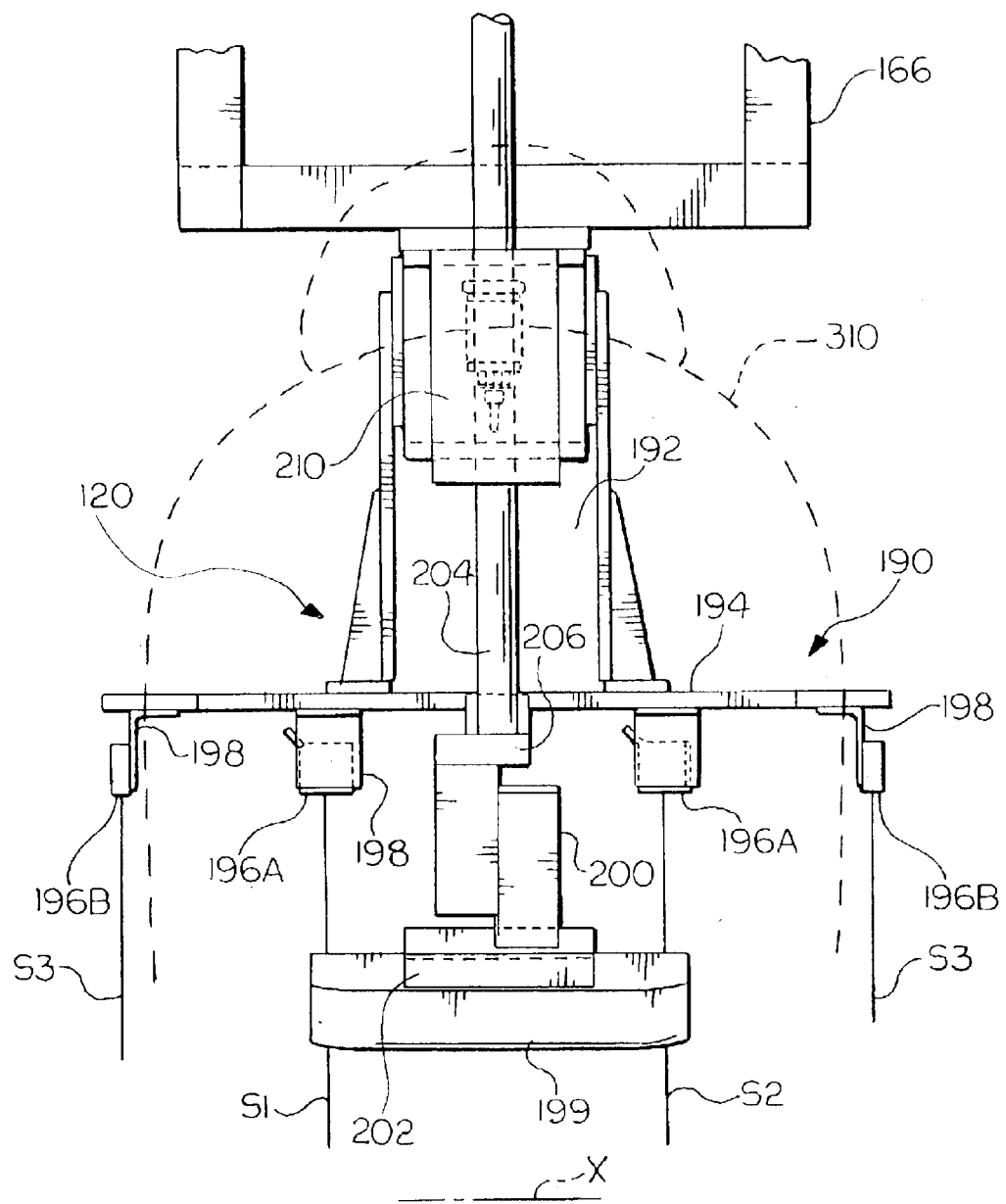
FIG. 11 shows enlarged front elevational view of the apparatus shown in FIG. 10.

As shown in FIGS. 10 and 11, a seat sensing assembly 190 may be provided for sensing the position of the seat 310. The seat sensing assembly 190 in the illustrated embodiment of the invention has a bracket 192 supported in a fixed relation to the weight 120. A sensor plate 194 is held in fixed relation to the bracket 192. The sensor plate 194 supports one or more sensors, such as the photoelectric sensors 196A, 196B shown. Each sensor 196A, 196B is preferably supported in fixed relation to the sensor plate 194 by an L-shaped bracket 198. One or more front sensors 196A are provided for sensing or detecting the front edge of the seat 310. One or more side sensors 196B are provided for sensing or detecting the sides of the seat 310. As shown in FIG. 10, one of the front sensors 196A transmits a signal S1 that is reflected back from the seat 310. The other front sensor 196A transmits a signal S2 that is not reflected from the seat 310. These two sensors 196A are spaced a predetermined distance apart (e.g., about 15 mm) along the Y-axis. This establishes a predetermined window having a specified tolerance within which the front edge of the seat 310 is positioned. This parameter may be application specific. The drop weight 120 is positioned so that the front edge of the seat 310 lies within this window. The side sensors 196B are positioned to transmit signals S3 so that neither signal would be reflected from the seat 310 when the seat 310 is in a predetermined position, as shown in FIG. 11. There is sufficient clearance along the X-axis between the side sensors 196B to enable the seat 310 to fit within a specified tolerance therebetween. This parameter may be application specific. The drop weight 120 is positioned so that the side edges of the seat 310 fit between these sensors 196B. Positioning the drop weight 120 along these axis, in turn, positions the drop weight 120 within a specified tolerance of the "sweet spot" (i.e., a desired location of sensitivity) of the bladder 314 within the seat 310 (shown in FIG. 2). If the front edge of the seat 310 is not properly positioned between the two front sensors 196A, then an adjustment in the position of the seat 310 along the Y-axis can often be accomplished by adjusting the seat 310 along its tracks. If the sides of the seat 310 are not properly positioned between the side sensors 196B, then the seat 310 may be incorrectly mounted to the pallet 138 or the seat 310 may be improperly assembled. The former may be corrected by correctly mounting the seat 310 to the pallet 138. The later may be corrected by sending the seat 310 to a repair station or operator for repair. It should be appreciated by one of ordinary skill in the art that the seat sensing assembly 190 shown and described is provided for illustrated purposes. Other seat sensing assemblies may be suitable for carrying out and fall within the scope of the present invention.

As shown in FIGS. 10 and 11, the drop weight 120 includes a butt form 199 that is supported relative to an angular adjuster 200 by a form bracket 202. The angular adjuster 200 is provided for positioning the angle of the butt form 199 (described hereinbelow) relative to the seat 310, which matches the angle of the butt form 199 to the angle of the seat 310 to properly distribution of the force of impact of the drop weight 120 to the seat 310. This angle may be application specific. The angular adjuster 200 is supported relative to the bottom of one of more guide shafts, such as the linear races 204 shown, by a bottom plate 206. A weight 208 can be supported relative to the bottom plate 206. Each linear race 204 is supported for movement relative to one or more bearing blocks 210, which are attached to the aforementioned frame 166 via a bracket 212. The top of each linear race 204 is supported relative to a top plate 214 (shown in FIGS. 12 and 13). As the weight 120 drops free air, the linear races 204, which are held in fixed relation to one another by the plates 206, 214, slide in the bearing blocks 210. Any frictional resistance offered by the cooperation of the linear races 204 and the bearing blocks 210 is substantially inconsequential.

Figure 12:
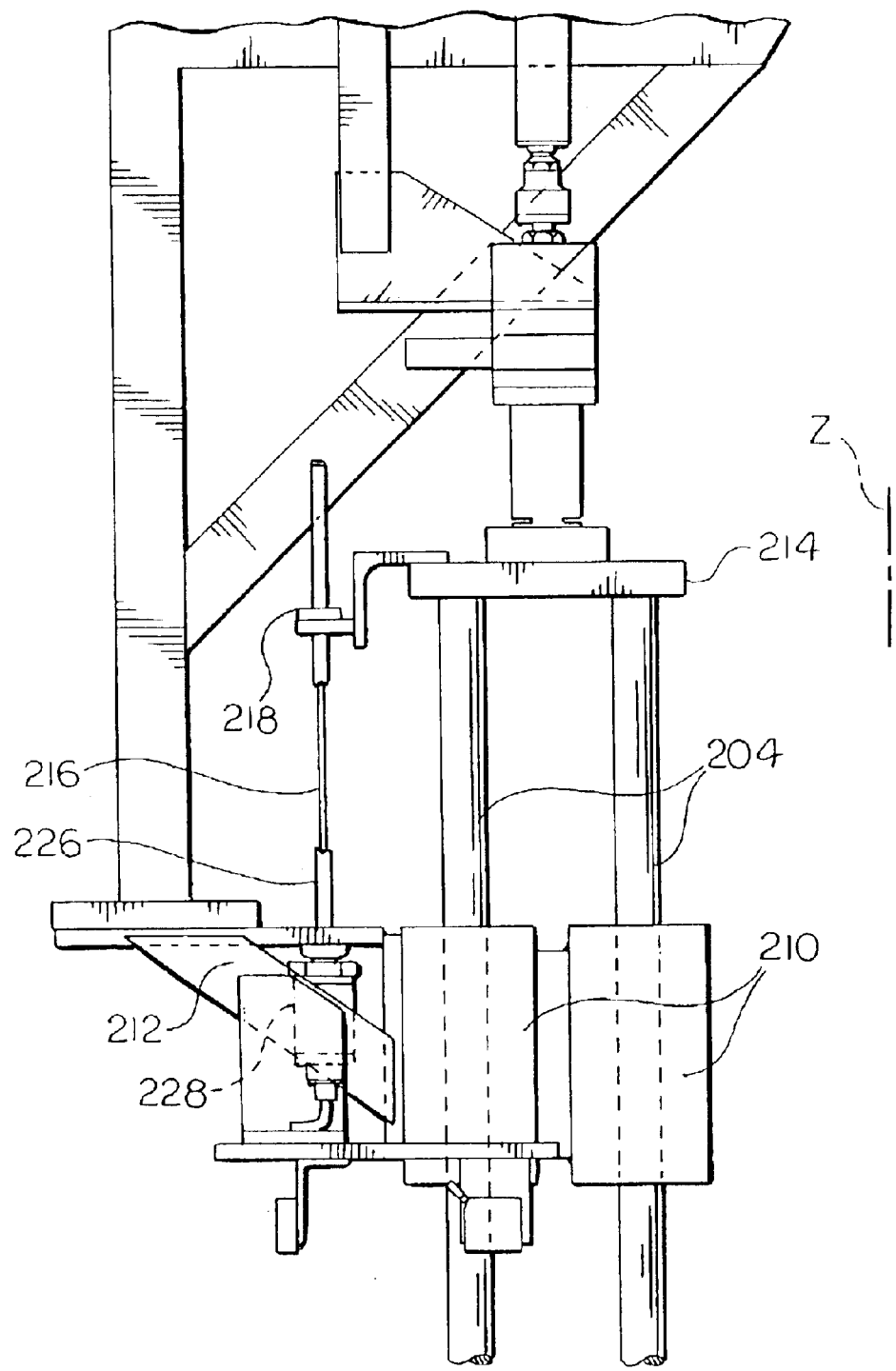
FIGS. 12 and 13 show enlarged side elevational views of an apparatus according to the present invention for positioning the drop weight in the Z direction in lowered and raised positions, respectively, and wherein the apparatus has a partially cutaway sensor tube to show a waveguide therein.
Figure 13:
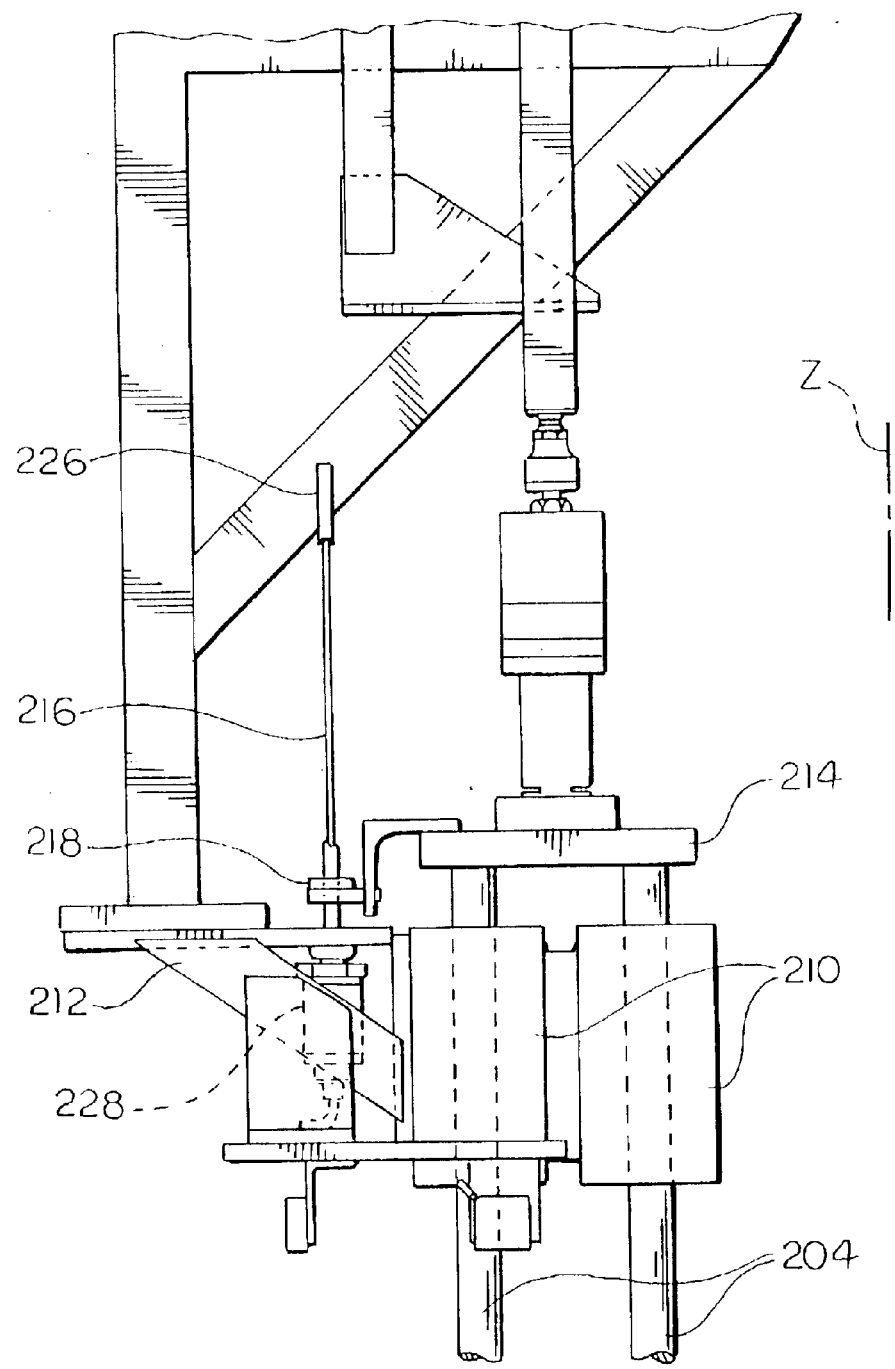

The actual drop distance is accurately established via a sensor. The sensor may be a linear displacement sensor, such as a linear-voltage differential transformer (LVDT). As shown in FIGS. 12 and 13, the sensor may be a Temposonics position sensor manufactured by MST Sensor Division, of Cary, N.C., USA. In the Temposonics position sensor, a pulse is induced in a specially designed magnetostrictive waveguide 216 by the momentary interaction of two magnetic fields. One field comes from a movable magnet 218 which passes along the outside of a sensor tube 226, the other field comes from a current pulse or interrogation pulse launched along the waveguide 216. The interaction between the two magnetic fields produces a strain pulse, which travels at sonic speed along the waveguide 216 until the pulse is detected at the head 228 of the sensor. The position of the magnet 218 is determined with high precision by measuring the elapsed time between the launching of the electronic interrogation pulse and the arrival of the strain pulse. As a result, accurate non-contact position sensing is achieved with absolutely no wear to the sensing components. In accordance with the illustrated embodiment of the invention, the head 228 of the sensor is fixed relative to the bearing block bracket 212. The magnetic plate 218 is fixed relative to the plate 214 at the top of the linear races 204. As the drop weight 120 moves, the magnetic plate 218 moves. The position of the magnet 218 along the waveguide 216 is determined with high precision.

A gripper 220 is provided for gripping the drop weight 120 and retracting the drop weight 120 from its dropped position on the seat 310. The gripper 220 preferably includes a pair of parallel gripper jaws 220A. To retrieve the drop weight 120, the weight drop mechanism actuator 188 is extended with the gripper jaws 220A open to a fully extended position, such as about 5 inches (127 mm). The actuator 188 must extend sufficiently to retrieve the weight 120 even from the most compliant seat cushion. The gripper jaws 220A are structured to grip a knob 222 on the drop weight 120. The knob 222 of the illustrated embodiment is T-shaped and the gripper jaws 220A form a corresponding C-channel for gripping the knob 222. The gripper jaws 220A are closed to grip the knob 222, as shown in FIG. 7. The gripper jaws 220A preferably have a clearance (e.g., 2 inches) around the weight knob 222 to allow for seat height variation. The actuator 188 is retracted to raise the drop weight 120 to the "start", "ready", and "hold" positions. From a retracted position, the gripper jaws 220A open and drop the weight 120.

One or more switches 224 are provided for sensing the operation of the gripper jaws 220A. The switches 224 are preferably Hall-effect switches, which are well known by those of ordinary skill in the art of the invention. Although not shown, the gripper jaws 220A are controlled by pistons inside the gripper 220. The pistons carry a magnetic material. The Hall-effect switches produce a voltage output corresponding to the presence of the magnetic material. One of the switches 224 senses the presence of the magnetic material when the gripper jaws 220 are open and one of the switches 224 senses the presence of the magnetic material when the gripper jaws 220A are closed. This provides an indication that the gripper jaws 220A are in an open and closed state. This provides diagnostics to insure that the gripper jaws 220A are open when the drop weight 120 is released and closed when the drop weight 120 is retracted. It should be appreciated by one of ordinary skill in the art that the drop distance can be set in any suitable manner and that the scope of the present invention is not intended to be limited to the structure shown and described above.

A load cell 230 or similar device measures load of the drop weight (e.g., 64 lb.±4 oz.) during each threshold set and verification operation. The drop weight may be application specific. The load cell 230 monitors that load prior to each drop. For example, the load cell 230 measures a load each time the weight 120 is in the retracted position, thus any changes in the load (e.g., due to increased friction resulting from wear or the collection of dust on the bearings or bearing blocks) are monitored each time the weight 120 is in the retracted position. This also allows the load of the drop weight 120 to be recorded prior to each drop. An example of a load cell for use in the present invention is model 41, by Sensotec, Inc., of Columbus, Ohio, USA. In accordance with the preferred embodiment of the invention, the load cell 230 measures the load of the drop weight 120 and the gripper 220. The load of the gripper 220, which is known (e.g., about 12 lb.), is subtracted from the measured load (e.g., about 76 lb.) to arrive at the load of the drop weight (e.g., about 64 lb.).

To insure free-fall and proper loading of the seat 310 during each threshold set and verification operation, the velocity of the weight-drop 120 can be determined from the drop distance. For example, a drop velocity that is about 95% to 100% of 1 G is 386*Sq. Root of ("measured drop distance"/193). The drop distance may be measured within a specified tolerance, such as ±5%. This tolerance may be application specific.

The weight-drop machine 110 according to the preferred embodiment of the invention interfaces, mechanically and electrically, with the seat manufacturing plant assembly line and peripherals, such as a barcode reader and a traceability system. Electronic software interfaces with the seat's electronic control unit 318 and the occupant detection system's calibration threshold value. The weight-drop machine 110 controls parameters, such as the total weight applied, the drop distance (i.e., along the Z-axis), acceleration of the weight along the Z-axis, and the drop position along the X and Y-axis.

After the calibration value is calculated and stored, the seat 310 is tested to verify the system response. In the verification operation, initial threshold data is compared with verification data. The data must be within a specified tolerance.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A weight-drop machine for performing calibration and verification of occupant detection systems, comprising:
    a base;
    a lift frame supported for movement relative to the base;
    a keeper plate supported in a fixed position relative to the base; and
    a displacement element supported in a fixed position relative to the base and the lift frame, the displacement element being adapted to move the lift frame relative to the base, the lift frame being adapted to support and lift a pallet toward the keeper plate to cause the pallet to engage the keeper plate so that the pallet is prevented from further movement.

2. The weight-drop machine of claim 1, wherein the lift frame is supported for movement relative to the base by a linear bearing.

3. The weight-drop machine of claim 1, wherein the lift frame is supported for movement relative to the base by a plurality of spaced apart linear bearings.

4. The weight-drop machine of claim 1, wherein the lift frame is supported for movement relative to the base by a bearing supported relative to the base and a guide shaft supported relative to the lift frame, the guide shaft being supported for movement relative to the bearing.

5. The weight-drop machine of claim 1, wherein the displacement element is a pneumatic actuator.

6. The weight-drop machine of claim 1, further including at least one pallet-locating member supported relative to the lift frame.

* * * * *